C. N. GREIG.
ADVERTISEMENT DEVICE.
APPLICATION FILED APR. 22, 1918.

1,374,501.

Patented Apr. 12, 1921.

INVENTOR
Carlisle N. Greig
BY
ATTORNEY

UNITED STATES PATENT OFFICE.

CARLISLE N. GREIG, OF CHICAGO, ILLINOIS.

ADVERTISEMENT DEVICE.

1,374,501. Specification of Letters Patent. Patented Apr. 12, 1921.

Application filed April 22, 1918. Serial No. 229,904.

*To all whom it may concern:*

Be it known that I, CARLISLE N. GREIG, United States citizen, residing in Chicago, Illinois, have invented the following described Improvements in Advertisement Devices.

The invention is an article of manufacture for facilitating the collection of "want ads." or other advertisements to be printed in a newspaper or periodical, and for cognate uses, and as herein shown consists in a post or mailing card bearing certain printed matter and spaces of such character and in such correlation as to simplify the procedure of inserting advertisements on the part of the advertiser or user, and to diminish very materially the expense and detail involved, on the part of the newspaper, in listing and printing the advertisements as well as in distributing and delivering the replies therefrom.

The accompanying drawing illustrates the form of the invention at present preferred and which is herein used to exemplify its principles.

Figure 2:
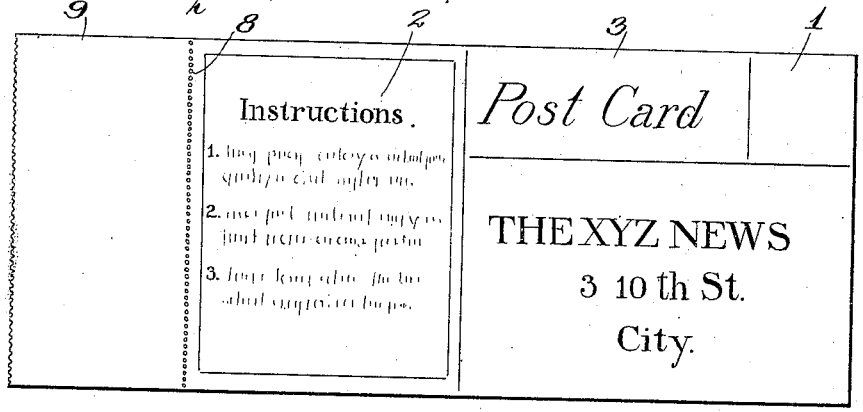
Fig. 2 is the obverse face.

The device is preferably a rectangular card of usual post-card thickness and of any appropriate size and material. On its obverse face, as shown in Fig. 2, it bears the name and address of the publisher of the newspaper or advertising medium which, it will be understood, is the distributing vender of the device. The same side of the card bears a stamp, or a place for one as indicated at 1 and a space, 2, laterally adjacent to the address containing instructions or suggestions as to the use of the device.

Figure 1:
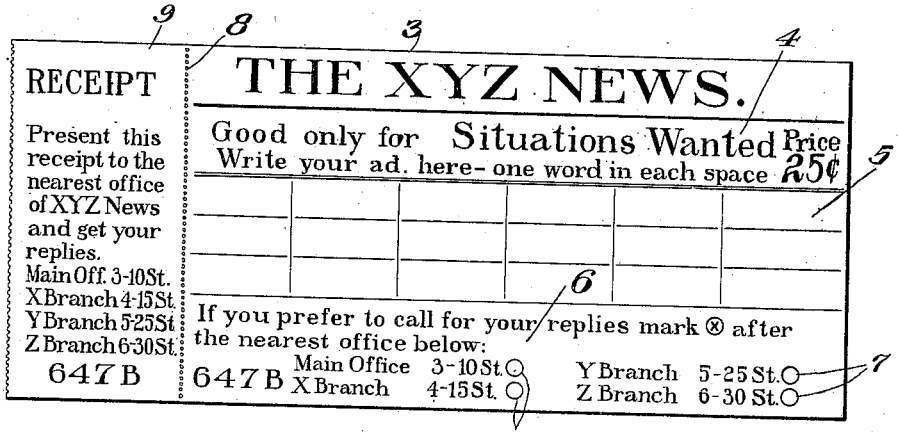
Figure 1 is a plan of the reverse face of the advertisement device with the identification or receipt card attached.

On its reverse side, shown in Fig. 1, the card bears, near the top edge 3, the name of the vender newspaper or advertising medium as for instance "*The X. Y. Z. News*," and below this an indication, 4, of advertisement classification, that is to say a statement of what the card represents, whether for a "situation wanted" advertisement or a "help wanted" advertisement, "rooms to let" or whatever it may be, and this indication may also include an index of the permissible length of the advertisement or the number of times the advertisement is to be printed and is preferably also accompanied by the valuation of the card which corresponds to the charge to the advertiser for printing the particular advertisement. Thus in the case illustrated in the drawing the indication comprises the statement "Good only for situations wanted"—and the valuation "25 cents," and, because not otherwise stated, this implies a single publication. Below the indication 4 there is a space 5 divided into word sections in which the advertisement is to be written, the number of said sections indicating the maximum number of words permitted and conforming to the indication 4 where appropriate. Below this space there follows a list 6 of the places, such as the branch offices of the newspaper, where the replies to the published advertisement may be sent and where they may be called for by the advertiser. The list is accompanied by instructions to the advertiser to select the place to which he prefers they shall be sent and for this purpose a small circumscribed space or box 7 follows the name of each place to receive his designating check mark. The card also bears an individual serial number such as "647B."

Associated with the card bearing the foregoing spaces and printed matter and preferably attached thereto by a weakened or perforated line 8 is an identification card or coupon 9 which bears again the name of the newspaper, a list of its branch offices or the places where replies are to be called for, and the same serial number as appears on the main card.

Figure 3:
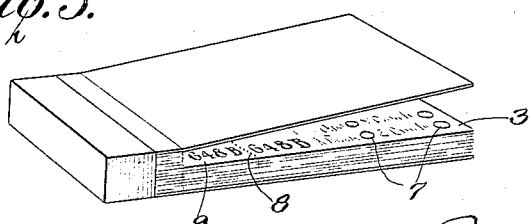
Fig. 3 illustrates a pad or book of such cards.

Such cards and coupons all bearing different serial numbers, but some of them identified as pertaining to different classifications of advertisement, are sold or consigned by the newspaper to various retailers, distributed throughout the area served by the newspaper and are kept on sale by the latter at a cost corresponding to the valuation fixed by the respective indications thereon. Conveniently they are sold in book or pad form as shown in Fig. 3. The intending advertiser wishing to insert an advertisement say for a "situation wanted" and having purchased a card identified as for that purpose, writes his advertisement in the spaces 6. If he wishes to call for the reply to his advertisement he makes a check mark in one of the spaces 7 following the name of the branch office which is nearest or most convenient to him. He then mails the card keeping the coupon 9 as a receipt and which, because it bears the same serial number as the card is a means of identification of the advertisement he has written in case of miscarriage in the mail or other contingency. As against the ordinary process of inserting advertisements in the newspaper, the simplicity and convenience of the foregoing procedure will be apparent. The advertiser has merely to buy a post-card of the suitable kind, write his advertisement thereon and mail it, which is obviously much simpler and easier and far quicker than personally calling at the newspaper office for the same purpose and it is also much less liable to error than if he should telephone the advertisement to the newspaper office.

On arrival at the newspaper office, through the mail or otherwise, the post-card serves as so-called printers copy, being sent directly as such to the composing room where the serial number of the card may become incorporated at the end of the advertisement in the place of the usual "box" number to indicate to the reader of the advertisement how to address his reply and, if the advertiser has placed a check mark in one of the spaces 7, the compositor also includes the name of the checked office in the printed advertisement so that the reader of the advertisement is thus advised of the advertiser's complete address for the purposes of reply. For example, in the case illustrated in the drawing and assuming the advertiser has checked the main office, the compositor would add to the advertisement as written "Address 647B Main Office" which would direct all the replies to the main office. At the same time the different indications 4 on the cards received, each of which indications is preferably associated with some distinctive color of card, signifies at once to the foreman of the composing room under which column or section of the newspaper to assign the particular advertisement. In the case in hand such classification would be under "Situations Wanted." Inasmuch as all the cards are differently numbered it follows that there will be no duplicate "box" numbers appearing in the printed advertisements, each advertiser being thus assured that his replies will not be received by others even though inadvertently sent to the wrong office or though sent long after the publication of the advertisement. The designated branch office receiving the replies to the advertisement will readily classify them according to the said serial numbers to be delivered to the advertiser on presentation of his identification coupon bearing the same number, which is his authority to receive them. Thus it will be apparent that by the use of the described card the newspaper office not only saves the expense incident to the reception and personal attention to every individual advertiser but also the expense incident to carrying on a business of many small transactions and receives its advertising copy in standard, uniform shape ready to set up and already classified so that much of the time and labor commonly involved in collecting advertising copy is eliminated. Moreover the use of the described card involves a prepayment to the newspaper of the charge for printing every advertisement because the valuation of the card is equal to or at least sufficient to cover that charge and the payment therefor has already reached the vender or newspaper in the form of cash or credit through its retailer which fact tends to eliminate small accounts with many customers and the expense of collecting them.

While the spaces and the matter printed on the card may be variously combined within the principle of the invention it will be noted that the written advertisement carried by the card is in effect an order for certain specified services, prepaid according to the definite valuation of the card itself which valuation corresponds to the charge for the thing or service ordered and that the card itself with its attached coupon is the means of conveying such order and identifying the proper recipient of the reply thereto.

It will be understood that the words "indication" and "indicated" as used in the specification and claims do not necessarily imply the use of written or printed matter, since other means of conveying the valuation and other means of suggesting the purpose of some of the spaces may be employed with like effect.

Claims.

1. As an article of manufacture, a card for conveying advertising copy to an advertising medium having an indicated valuation corresponding to the charge for publishing such copy and bearing an indication of the advertisement classification to which it pertains, an appropriately indicated space on which said advertising copy is to be written and an indication of the number of words permissible in said copy.

2. As an article of manufacture, a card for conveying advertising copy to an advertising medium having an indicated valuation corresponding to the charge for publishing said copy and bearing an indication of the advertisement classification to which it pertains, an appropriately indicated space in which said advertising copy is to be written, and a serial number, and being combined with an identification coupon bearing a like serial number.

3. As an article of manufacture, a card for conveying advertising copy to an advertising medium having an indicated valuation corresponding to the charge for publishing such copy and providing an appropriately indicated space in which such copy is to be written, an indication of the permissible length of said copy and an appropriately designated space for the selection of the reply address.

4. As an article of manufacture, a card for conveying advertising copy to an advertising medium having an indicated valuation corresponding to the charge for publishing such copy and providing an appropriately indicated space in which such copy is to be written, said card being provided with a list of places constituting reply addresses with instructions to select, by checking, one of them and a serial number, said card being combined with an identification coupon bearing a like number to identify the user thereof.

5. As an article of manufacture, a post-card for conveying advertising copy to an advertising medium, addressed to such medium and having indicated thereon a definite valuation corresponding to the charge for publishing such copy and providing an appropriately indicated space to receive said copy, said card being provided with an indication of the permissible length of such copy and a serial number and being combined with an identification coupon bearing a like number.

6. As an article of manufacture, a post-card for conveying advertising copy to a newspaper or advertising medium, addressed to such newspaper and having an indicated valuation corresponding to the charge for publishing such copy and providing an appropriately indicated space to receive said copy, said card bearing an indication of said valuation and an indication of the advertisement classification to which the card pertains, in combination with a coupon bearing means of identification of the user of the card.

7. As an article of manufacture, a card for conveying an order to be written thereon and an indication of the reply address, said card having a definite valuation corresponding to the charge for the thing or service ordered and bearing an indication of such valuation, and a serial number, combined with an identification coupon bearing a like number.

8. As an article of manufacture, a card comprising a post-card part for conveying a written order and an identification coupon part to be retained by the person placing the order, said post-card part being provided with an indicated space or spaces for receiving said order, the address of the sender for the purposes of the order, the address of the person on whom the order is placed, and a post office stamp, and bearing an appropriate indication of the scope of an order that will be filled on the receipt thereof, said post-card part and coupon part bearing similar identification marks and the article of manufacture bearing an appropriate designation that the coupon part is to be separated from the post-card part prior to mailing the latter.

9. Coöperating articles of manufacture comprising a post-card for conveying a written order and an identification coupon to be retained by the person placing the order, said post-card being provided with an indicated space or spaces for receiving said order, address of the sender for the purposes of said order, the address of the person on whom the order is placed, and a post-office stamp, and bearing an appropriate indication of the scope of an order that will be filled on the receipt thereof, said coupon and post-card bearing similar identification marks.

In testimony whereof, I have signed this specification.

CARLISLE N. GREIG.